(12) United States Patent
Bedrine et al.

(10) Patent No.: US 10,337,409 B2
(45) Date of Patent: Jul. 2, 2019

(54) METHOD FOR ASSISTING A TURBOSHAFT ENGINE IN STANDBY OF A MULTIPLE-ENGINE HELICOPTER, AND ARCHITECTURE OF A PROPULSION SYSTEM OF A HELICOPTER COMPRISING AT LEAST ONE TURBOSHAFT ENGINE THAT CAN BE IN STANDBY

(71) Applicant: SAFRAN HELICOPTER ENGINES, Bordes (FR)

(72) Inventors: Olivier Bedrine, Bosdarros (FR); Olivier Pierre Descubes, Nay (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 268 days.

(21) Appl. No.: 15/124,669

(22) PCT Filed: Mar. 20, 2015

(86) PCT No.: PCT/FR2015/050690
§ 371 (c)(1),
(2) Date: Sep. 8, 2016

(87) PCT Pub. No.: WO2015/145034
PCT Pub. Date: Oct. 1, 2015

(65) Prior Publication Data
US 2017/0016399 A1     Jan. 19, 2017

(30) Foreign Application Priority Data
Mar. 27, 2014 (FR) ...................... 14 52646

(51) Int. Cl.
*F02C 6/02*     (2006.01)
*F02C 7/277*    (2006.01)
(Continued)

(52) U.S. Cl.
CPC .............. *F02C 7/277* (2013.01); *B64C 27/04* (2013.01); *B64D 27/10* (2013.01); *F02C 6/02* (2013.01);
(Continued)

(58) Field of Classification Search
CPC .......... F02C 7/277; F02C 7/275; F02C 7/268; F02C 6/02; F02C 6/06; F02C 6/08
See application file for complete search history.

(56) References Cited

U.S. PATENT DOCUMENTS

2009/0314002 A1* 12/2009 Libera ...................... F02C 6/08
                                                      60/778
2012/0111022 A1*  5/2012 Dyer ....................... F02C 7/277
                                                      60/788

(Continued)

FOREIGN PATENT DOCUMENTS

| EP | 2267288 | 12/2010 |
|----|---------|---------|
| EP | 2602458 | 6/2013  |
| FR | 2992024 | 12/2013 |

OTHER PUBLICATIONS

International Search Report with English Language Translation, dated Jul. 7, 2015, PCT Application No. PCT/FR2015/050690.

*Primary Examiner* — Steven M Sutherland
(74) *Attorney, Agent, or Firm* — Womble Bond Dickinson (US) LLP

(57) ABSTRACT

The invention relates to an architecture of a propulsion system of a multiple-engine helicopter comprising turboshaft engines (5, 6), characterised in that it comprises: at least one hybrid turboshaft engine (5) that is capable of operating in at least one standby mode during a stable flight of the helicopter, the other turboshaft engines (6) operating alone during this stable flight; an air turbine (30) that is mechanically connected to the gas generator (17) of the hybrid turboshaft engine (5) and is suitable for rotating said (Continued)

gas generator (17); means for withdrawing pressurised air from the gas generator (27) of a running turboshaft engine (6); and a duct (31) for routing this withdrawn air to said air turbine (30).

13 Claims, 1 Drawing Sheet

(51) Int. Cl.
*F02C 6/08* (2006.01)
*B64C 27/04* (2006.01)
*B64D 27/10* (2006.01)

(52) U.S. Cl.
CPC .......... *F02C 6/08* (2013.01); *F05D 2220/329* (2013.01); *Y02T 50/671* (2013.01)

(56) References Cited

U.S. PATENT DOCUMENTS

2013/0031912 A1* 2/2013 Finney .................... F01D 15/10
60/778
2013/0086919 A1* 4/2013 Dooley .................... F02C 7/26
60/778

* cited by examiner

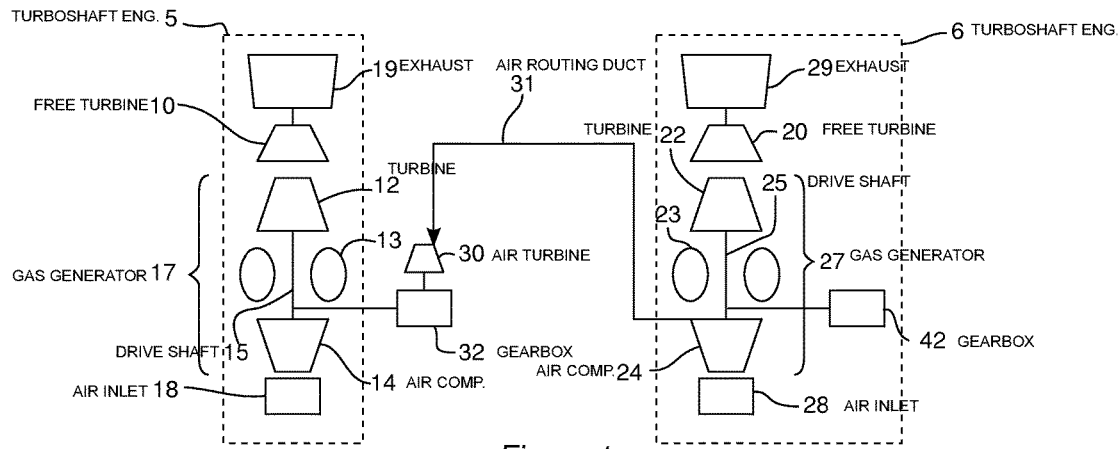
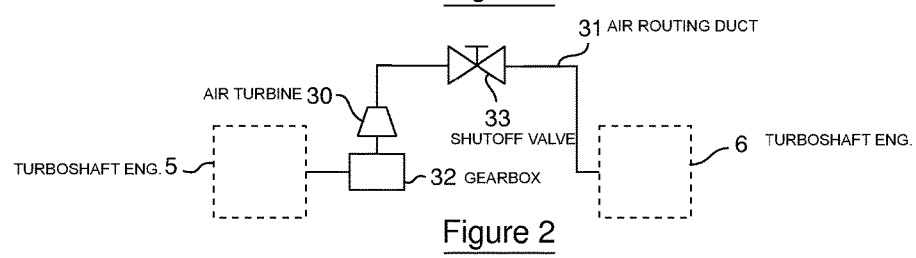
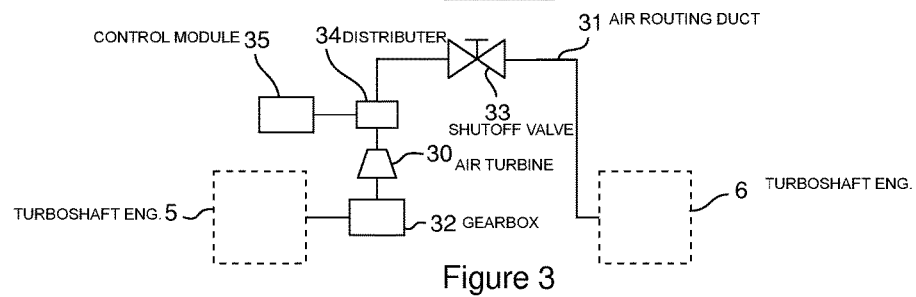
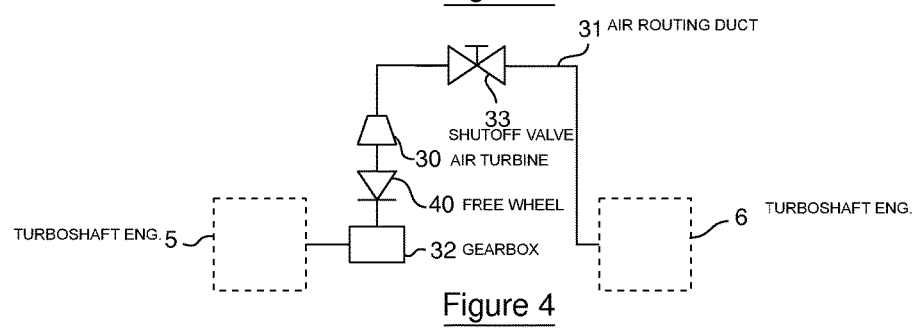

us 10,337,409 B2

METHOD FOR ASSISTING A TURBOSHAFT ENGINE IN STANDBY OF A MULTIPLE-ENGINE HELICOPTER, AND ARCHITECTURE OF A PROPULSION SYSTEM OF A HELICOPTER COMPRISING AT LEAST ONE TURBOSHAFT ENGINE THAT CAN BE IN STANDBY

1. TECHNICAL FIELD OF THE INVENTION

The invention relates to a method for assisting a turboshaft engine in standby mode of a multiple-engine, in particular twin-engine, helicopter. The invention also relates to an architecture of a propulsion system of a multiple-engine helicopter comprising at least one turboshaft engine that is capable of being placed in a specific standby mode.

2. TECHNOLOGICAL BACKGROUND

A helicopter is generally provided with at least two turboshaft engines which operate at similar modes that depend on the flight conditions of the helicopter. Throughout the following text, a helicopter is said to be in a cruise flight situation when it is progressing in normal conditions during all the flight phases apart from transitional phases of take-off, ascent, landing or hovering flight. Throughout the following text, a helicopter is said to be in a critical flight situation when it is necessary for it to have available the total installed capacity, i.e. during the transitional phases of take-off, ascent, landing and the mode in which one of the turboshaft engines malfunctions, referred to by the abbreviation OEI (One Engine Inoperative).

It is known that, when the helicopter is in a cruise flight situation, the turboshaft engines operate at low power levels, below their maximum continuous thrust. These low power levels result in a specific consumption (hereinafter SC), which is defined as the relationship between the hourly fuel consumption by the combustion chamber of the turboshaft engine, and the mechanical power provided by said turboshaft engine, which is approximately 30% greater than the SC of the maximum take-off thrust, and thus an overconsumption of fuel during cruise flight.

Moreover, the turboshaft engines of a helicopter are designed so as to be oversized in order to be able to keep the helicopter in flight in the event of failure of one of the engines. This flight situation corresponds to the OEI mode described above. This flight situation occurs following the loss of an engine, and results in the fact that each functioning engine provides a power that is significantly greater than its rated power in order to allow the helicopter to overcome a dangerous situation, and to then continue its flight.

At the same time, the turboshaft engines are also oversized so as to be able to ensure flight in the entire flight range specified by the aircraft manufacturer, and in particular flight at high altitudes and during hot weather. These flight points, which are very restrictive, in particular when the helicopter has a mass that is close to its maximum take-off mass, are only encountered in specific use cases.

These oversized turboshaft engines have an adverse effect in terms of mass and in terms of fuel consumption. In order to reduce this consumption during cruise flight it is envisaged to stop one of the turboshaft engines during flight and to place it in a mode referred to as standby. The active engine or engines then operate at higher power levels in order to provide all the necessary power, and therefore at more favourable SC levels.

In FR1151717 and FR1359766, the applicants have proposed methods for optimising the specific consumption of the turboshaft engines of a helicopter by means of the possibility of putting at least one turboshaft engine into a stable power mode, known as continuous, and at least one turboshaft engine into a particular standby mode that it can leave in an urgent or normal manner, according to need. Leaving the standby mode is said to have occurred normally when a change in the flight situation requires the turboshaft engine in standby to be activated, for example when the helicopter is going to transition from a cruise flight situation to a landing phase. Leaving standby mode normally in this manner occurs over a period of between 10 seconds and 1 minute. Leaving the standby mode is said to have occurred urgently when a failure of or a power deficit in the active engine occurs, or when the flight conditions suddenly become difficult.

Leaving standby mode urgently in this manner occurs over a period of less than 10 seconds.

The applicants have thus proposed in particular the following two standby modes:

a standby mode known as assisted super-idling, in which the combustion chamber is ignited and the shaft of the gas generator rotates, in a mechanically assisted manner, at a speed of between 20 and 60% of the nominal speed. A mode of this kind makes it possible for the gas generator to be at the lowest possible rotational speed in order to minimise the fuel consumption. In order to improve the performance of the gas generator at this low speed, it is proposed to inject mechanical energy into the gas generator by means of an external source.

a standby mode known as banking, in which the combustion chamber is extinguished and the shaft of the gas generator rotates, in a mechanically assisted manner, at a speed of between 5 and 20% of the nominal speed. A mode of this kind makes it possible to keep a rotation of the gas generator in a speed range that permits more rapid ignition of the combustion chamber if necessary.

These two standby modes thus require the gas generator to be continuously assisted. The duration of the assistance can be several hours during the helicopter mission. The technical problem is therefore that of providing a method for mechanically assisting a turboshaft engine in standby mode. A further technical problem is that of providing an architecture of a propulsion system that makes it possible to ensure the mechanical assistance of the gas generator of a turboshaft engine in standby mode during the mission.

3. OBJECTS OF THE INVENTION

The invention aims to provide a method for mechanically assisting the gas generator of a turboshaft engine in standby mode.

The invention also aims to provide an architecture of a propulsion system that makes it possible to ensure the mechanical assistance of the gas generator of a turboshaft engine in standby mode during the mission.

The invention also aims to provide, in at least one embodiment, an architecture of this kind that does not require a specific electrical machine.

4. DESCRIPTION OF THE INVENTION

In order to achieve this, the invention relates to an architecture of a propulsion system of a multiple-engine helicopter comprising turboshaft engines, each turboshaft engine comprising a gas generator and a free turbine that is rotated by the gases from said gas generator.

An architecture according to the invention is characterised in that it comprises:
- at least one turboshaft engine from among said turboshaft engines, referred to as the hybrid turboshaft engine, that is capable of operating in at least one standby mode during a stable flight of the helicopter, the other turboshaft engines, referred to as running turboshaft engines, operating alone during this stable flight,
- an air turbine that is mechanically connected to said gas generator,
- means for withdrawing pressurised air from the gas generator of a running turboshaft engine,
- a duct for routing this withdrawn air to said air turbine such that the air turbine can transform the energy from said pressurised air into mechanical energy that drives said gas generator of said hybrid turboshaft engine.

An architecture according to the invention thus makes it possible to provide mechanical power to the gas generator of the hybrid turboshaft engine by means of an air turbine. This air turbine is powered by the pressurised air withdrawn from a running turboshaft engine. The architecture according to the invention thus makes it possible to mechanically assist the gas generator of the hybrid turboshaft engine when said engine is put into an "assisted super-idling" standby mode or a "banking" standby mode.

This mechanical assistance is possible without, however, needing to use an external electrical machine. The invention thus permits savings in mass, cost and service life compared with electrical assistance. Furthermore, the invention does not require electrical energy to be withdrawn from the on-board network of the helicopter.

An architecture according to the invention uses a primary energy source that is already available in a propulsion system, in the form of pressurised air provided by a running turboshaft engine. The architecture according to the invention can therefore be obtained from an already existing architecture of a propulsion system, without the need for significant modifications to be made to the architecture.

A hybrid turboshaft engine is a turboshaft engine that is configured so as to be able to be placed, on demand and voluntarily, in at least one predetermined standby mode that it can leave in a rapid (also referred to as urgent) or normal manner. A turboshaft engine can only be in standby mode during a stable flight of the helicopter, i.e. when a turboshaft engine of the helicopter has not failed, during a cruise flight situation when it is progressing in normal conditions. Leaving the standby mode consists in changing the turboshaft engine to an acceleration mode of the gas generator by means of driving in a manner that is compatible with the leaving mode required by the conditions (normal standby-leaving mode or rapid standby-leaving mode, also referred to as urgent).

Advantageously and according to the invention, the means for withdrawing air from the gas generator of a running turboshaft engine comprise at least one withdrawal port that is integrated on a compressor of this running turboshaft engine.

According to this variant, the pressurised air is withdrawn directly from a compressor of the running turboshaft engine. Air withdrawal of this kind makes it possible to respond to the pressurised air requirements for powering the air turbine without, however, having an impact on the performance of the running turboshaft engine from which the air is withdrawn.

Advantageously and according to the invention, the air withdrawal means comprise a discharge jet that makes it possible to meter the flow of air withdrawn from said running turboshaft engine.

The presence of a discharge jet, preferably arranged directly on the air withdrawal port, makes it possible to limit the maximum airflow delivered to the air turbine in the event of breakage of the duct for routing air to the air turbine or in the event of a failure in the assistance circuit.

Advantageously and according to the invention, said air turbine is mechanically connected to said gas generator by means of an accessory gearbox.

An accessory gearbox makes it possible to drive ancillaries necessary for the operation of the gas generator of the hybrid turboshaft engine, and helicopter equipment, such as air conditioning devices. According to this variant, the air turbine is directly integrated on said accessory gearbox, making it possible to both simplify the installation thereof and the interconnection thereof with the gas generator of the hybrid turboshaft engine, and to provide a portion of the power that is necessary for driving ancillaries and/or for supplying power to helicopter equipment.

Advantageously, an architecture according to the invention comprises means for adjusting the mechanical power delivered by said air turbine to said gas generator of said hybrid turboshaft engine.

The adjustment means make it possible to adapt the mechanical power delivered to the gas generator of the hybrid turboshaft engine according to need. In particular, for a hybrid turboshaft engine that can operate on demand in a plurality of distinct standby modes, in particular an assisted super-idling mode, and a banking mode, the adjustment means make it possible to adapt the power to each mode.

Advantageously and according to this variant, said adjustment means comprise means for controlling the flow and/or the pressure of air provided to said air turbine.

According to this variant, the power adjustment is obtained by means of controlling the flow and/or the pressure of the air that powers the air turbine.

These control means can be of any kind. For example, according to a first variant, these control means comprise a controlled valve that is arranged on the air-routing duct. This valve can be a two-state shutoff valve having a pass-through state in which the air circulates freely in the routing duct, and a blocked state in which the air cannot power the air turbine. According to another variant, these control means comprise a variable-pitch distributor that is integrated in the air turbine and is capable of determining the flow and/or the pressure of air of the air turbine. According to another variant, the control means comprise a plurality of points for injecting air into the air turbine that are controlled by valves or by a single distributor.

Advantageously, an architecture according to the invention comprises means for reading information representative of the operation of said hybrid turboshaft engine, and said control means are dependent on this information.

According to this variant, the information representative of the operation of the hybrid turboshaft engine is used to determine the flow and/or the pressure of air to be delivered to the air turbine, making it possible to adapt the power delivered to the gas generator of the hybrid turboshaft engine depending on the operating state of the hybrid turboshaft engine. For example, this information is measures of parameters such as the rotational speed of the gas generator or the temperature at the outlet of the high-pressure turbine of the gas generator. This information furthermore makes it possible to adapt the delivered power to the conditions observed, to cut off the power supply if an event necessitates this, or to cause the hybrid turboshaft engine to leave its standby mode in the event of a malfunction of the mechanical assistance provided to the gas generator by the air turbine. This information can also comprise a measure of the rotational speed of the air turbine, in order to prevent an overspeed that is related to a malfunction of the kinematic chain connecting the air turbine to the gas generator of the hybrid turboshaft engine.

Advantageously, an architecture according to the invention comprises a controlled mechanical disconnection device that is arranged between the air turbine and said gas generator of said hybrid turboshaft engine and that is capable of disconnecting said air turbine from said gas generator if there is no supply of air to the air turbine.

This disconnection device makes it possible to mechanically separate the air turbine from the gas generator of the hybrid turboshaft engine when the air withdrawal from the running turboshaft engine has been cut or does not exist. A device of this kind can be of any type. According to a variant, said device comprises a free wheel that is arranged between the output shaft of the air turbine and the shaft of the gas generator of the hybrid turboshaft engine. According to another variant, said device comprises a clutch mechanism. According to another variant, said device comprises a pawl.

Advantageously and according to the invention, the hybrid turboshaft engine comprises an engine compartment in which in particular the gas generator is arranged, and the air turbine comprises an air outlet which opens into said engine compartment of said hybrid turboshaft engine so as to limit the drop in temperature in this compartment and to facilitate restarting the turboshaft engine.

According to another variant, the air outlet opens to the outside of the engine compartment.

According to another variant, the air outlet is used to keep the temperature of the engine oil at a specific level, with the aim of facilitating restarting said engine.

According to another variant, the air outlet opens in an air inlet of the hybrid turboshaft engine in order to limit the drop in temperature of the parts inside the turboshaft engine, with the aim of facilitating restarting said engine.

The invention applies both to a twin-engine helicopter and to a three-engine helicopter. In the case of a three-engine helicopter, and according to a first variant, the three turboshaft engines are identical in size. One of the three turboshaft engines is a hybrid turboshaft engine capable of operating in at least one standby mode during a stable flight of the helicopter, the two other engines then being running engines and operating alone during this stable flight. In this case, the air turbine is arranged between one of the running turboshaft engines and the hybrid turboshaft engine.

According to another variant, the hybrid turboshaft engine is smaller than the two running turboshaft engines. It is the smaller engine that is capable of operating in a standby mode. In this case, the air turbine is arranged between one of the two large turboshaft engines and the hybrid turboshaft engine.

According to another variant, the three turboshaft engines are of different sizes. The smallest turboshaft engine can be switched off during stable flight, and one of the two larger engines is a hybrid turboshaft engine that is capable of being put into standby mode if necessary, the other turboshaft engine then being the running turboshaft engine. In this case, the air turbine is arranged between the two larger turboshaft engines, i.e. the hybrid turboshaft engine and the running turboshaft engine.

The invention also relates to a helicopter comprising a propulsion system, characterised in that said propulsion system has an architecture according to the invention.

The invention also relates to a method for mechanically assisting a turboshaft engine, referred to as the turboshaft engine in standby mode, that operates in a standby mode during a stable flight of a helicopter comprising turboshaft engines, each turboshaft engine comprising a gas generator and a free turbine, the other turboshaft engines, referred to as running turboshaft engines, operating alone during this stable flight.

A method according to the invention is characterised in that it comprises:
  a step of withdrawing pressurised air from the gas generator of a running turboshaft engine,
  a step of routing the withdrawn air to an air turbine that is mechanically connected to said gas generator of said turboshaft engine in standby mode,
  a step of transforming, by means of said air turbine, the energy from the air provided by said routing step into mechanical energy for driving said gas generator.

A method according to the invention is advantageously implemented by an architecture according to the invention. An architecture according to the invention advantageously implements a method according to the invention.

Advantageously and according to the invention, said air withdrawal step consists in withdrawing the air from a compressor of said gas generator of a running turboshaft engine.

Advantageously, a method according to the invention comprises a step of adjusting the mechanical power provided by said air turbine to said turboshaft engine in standby mode.

Advantageously and according to this variant, said step of adjusting the power comprises a step of controlling the flow and/or the pressure of air delivered to said air turbine.

The invention also relates to an assistance method, to a propulsion system architecture and to a helicopter, characterised in combination by all or some of the features mentioned above or below.

5. LIST OF DRAWINGS

Other aims, features and advantages of the invention will emerge from reading the following description, which is given purely by way of non-limiting example and relates to the accompanying drawings, in which:

FIG. 1 is a schematic view of an architecture of a propulsion system of a twin-engine helicopter according to an embodiment of the invention, FIG. 2 is a schematic view of an architecture of a propulsion system of a twin-engine helicopter according to a further embodiment of the invention, FIG. 3 is a schematic view of an architecture of a propulsion system of a twin-engine helicopter according to a further embodiment of the invention, a schematic view of a control device according to an embodiment of the invention, FIG. 4 is a schematic view of an architecture of a propulsion system of a twin-engine helicopter according to a further embodiment of the invention.

6. DETAILED DESCRIPTION OF AN EMBODIMENT OF THE INVENTION

The embodiments described below relate to an architecture of a propulsion system of a twin-engine helicopter. This being the case, a person skilled in the art will easily understand how to adapt the described embodiments to a multiple-engine, in particular three-engine, propulsion system.

This architecture comprises two turboshaft engines 5, 6. Each turboshaft engine 5, 6 is controlled by its own inspection-control device, which is not shown in the drawings for reasons of clarity.

Each turboshaft engine 5, 6 respectively, and as shown in FIG. 1, comprises a gas generator 17, 27 and a free turbine 10, 20 that is powered by the generator 17, 27. The gas generator 17, 27 comprises an air compressor 14, 24 to which air is supplied by an air inlet 18, 28. The compressor 14, 24 supplies a fuel, in the compressed air, to a combustion chamber 13, 23, which fuel delivers burned gas that provides kinetic energy. A turbine 12, 22 for partially expanding the burned gas is coupled to the compressor 14, 24 by means of a drive shaft 15, 25 so as to be able to rotate the compressor 14, 24 and the equipment necessary for the operation of the gas generator or the helicopter. This equipment is arranged in an accessory gearbox 32, 42. The resultant portion of the burned gas drives the free power transmission turbine 10, 20 in connection with the power transmission case of the helicopter, and is then discharged through the exhaust 19, 29.

In all of the following, it is assumed that the turboshaft engine 5 is a hybrid turboshaft engine that is capable of operating in at least one standby mode during a stable flight of the helicopter, the running turboshaft engine 6 then operating alone during this stable flight.

The architecture further comprises an air turbine 30 that is mechanically connected to the gas generator 17 of the hybrid turboshaft engine 5 by means of the accessory gearbox 32. Air is supplied to this turbine 30 by means of an air-routing duct 31. The air-routing duct 31 is connected to an air withdrawal port on the compressor 24 of the running turboshaft engine 6 so as to be able to convey the compressed air originating from the compressor 24 to the air turbine 30. The routing duct 31 is thus arranged between the air withdrawal port on the gas generator 27 of the running turboshaft engine 6 and an air intake inlet mouth of the air turbine 30. The air turbine 30 thus makes it possible to transform the energy that is available in the compressed air delivered by the air-routing duct 31 into mechanical energy that is available at the output shaft thereof.

According to an embodiment, this air turbine 30 is a reaction turbine of the axial or centripetal type. According to a further embodiment, the air turbine 30 is a partial-admission or full-admission impulse turbine.

According to an embodiment that is not shown in the drawings, the architecture further comprises a discharge jet that makes it possible to meter the flow of air withdrawn from the compressor 24 of the running turboshaft engine 6.

According to the embodiment of FIG. 2, the architecture comprises a controlled shutoff valve 33 that is a means for controlling the flow and the pressure of air delivered to the air turbine 30. According to this embodiment, the valve is suitable for being placed in two states: a first pass-through state in which all of the air withdrawn from the compressor 24 is delivered to the air turbine 30, and a second blocked state in which the air can no longer be delivered to the air turbine 30.

According to a further embodiment as shown in FIG. 3, the architecture further comprises a module 35 for controlling a variable-pitch distributer 34 of an air turbine 30 of the axial or centripetal type. This assembly forms the means for controlling the flow and the pressure of air delivered to the air turbine 30 and, by extension, forms the means for adjusting the mechanical power delivered to the gas generator 17 of the hybrid turboshaft engine 5.

According to the embodiment of FIG. 4, the architecture further comprises a free wheel 40 that is arranged between the air turbine 30 and the accessory gearbox 32. This free wheel 40 forms a controlled mechanical disconnection device for the air turbine 30 and the gas generator 17. This free wheel 40 thus makes it possible to ensure that the air turbine 30 is no longer mechanically connected to the gas generator 17 when air is no longer being supplied to said turbine by the air-routing duct 31.

The air outlet from the air turbine 30 may be arranged in various ways (not shown in the drawings).

For example, according to a first arrangement, the air at the outlet of the air turbine 30 is discharged into the engine compartment in order to limit the drop in temperature, with the aim of facilitating restarting the turboshaft engine in standby mode.

According to a further arrangement, the air at the outlet of the air turbine 30 is discharged to the outside of the engine compartment.

According to a further arrangement, the air is injected into the air inlet 18 of the turboshaft engine in standby mode in order to limit the drop in temperature of the parts inside the turboshaft engine, with the aim of facilitating restarting said engine.

According to a further arrangement, the air is used to keep the oil of the turboshaft engine at a temperature that is compatible with limiting the resisting torque when restarting the turboshaft engine, and so as to be able to rapidly have available all of the power necessary for this restart.

The invention also relates to a method for mechanically assisting the hybrid turboshaft engine 5 when it is in a standby mode.

The method comprises a step of withdrawing pressurised air from the gas generator of a running turboshaft engine, a step of routing the withdrawn air to an air turbine that is mechanically connected to said gas generator of said turboshaft engine in standby mode, and a step of transforming the energy available in the pressurised air into mechanical energy that is available at the shaft at the outlet of the accessory gearbox.

A method according to the invention is advantageously implemented by an architecture of a propulsion system according to the invention.

The invention claimed is:

1. Architecture of a propulsion system of a multiple-engine helicopter comprising turboshaft engines, each turboshaft engine comprising a gas generator and a free turbine that is rotated by gases from said gas generator,
wherein said propulsion system comprises:
at least one turboshaft engine from among said turboshaft engines, referred to as a hybrid turboshaft engine, that is capable of operating in at least one standby mode during a stable flight of the multiple-engine helicopter, the turboshaft engines, referred to as running turboshaft engines, operating alone during this stable flight,
an air turbine that is mechanically connected to said gas generator of said hybrid turboshaft engine,
means for withdrawing pressurized air from the gas generator of a running turboshaft engine,
a duct for routing withdrawn pressurized air to said air turbine such that the air turbine can transform energy from said pressurized air into mechanical energy that drives said gas generator of said hybrid turboshaft engine.

2. Architecture according to claim 1, wherein said means for withdrawing pressurized air from the gas generator of a running turboshaft engine comprise a withdrawal port that is arranged on a compressor of this running turboshaft engine.

3. Architecture according to claim 1, wherein said means for withdrawing pressurized air comprise a discharge jet that makes it possible to meter a flow of air withdrawn from said running turboshaft engine.

4. Architecture according to claim 1, wherein said air turbine is connected to said gas generator by means of an accessory gearbox (32).

5. Architecture according to claim 1, further comprising adjustment means for adjusting the mechanical power delivered by said air turbine to said gas generator of said hybrid turboshaft engine.

6. Architecture according to claim 5, wherein said adjustment means comprise control means for controlling flow and/or pressure of air provided to said air turbine.

7. Architecture according to claim 1, further comprising a controlled mechanical disconnection device that is arranged between the air turbine and said gas generator of said hybrid turboshaft engine and that is capable of disconnecting said air turbine from said gas generator if there is no supply of air to the air turbine.

8. Architecture according to claim 1, wherein said air turbine comprises an air outlet which opens into an engine compartment of said hybrid turboshaft engine so as to limit a drop in temperature in said engine compartment and to facilitate restarting said hybrid turboshaft engine.

9. Helicopter comprising a propulsion system, wherein said propulsion system has an architecture according to claim 1.

10. Method for mechanically assisting a turboshaft engine that operates in a standby mode during a stable flight of a helicopter comprising running turboshaft engines, each said running turboshaft engine comprising a gas generator and a free turbine, wherein said method comprises:
    a step of withdrawing pressurized air from the gas generator of one of said running turboshaft engines,
    a step of routing withdrawn air to an air turbine that is mechanically connected to said gas generator of said turboshaft engine in standby mode,
    a step of transforming, by means of said air turbine, energy from air provided by said step of routing withdrawn air into mechanical energy for driving said gas generator of said turboshaft engine in standby mode.

11. Method according to claim 10, wherein said step of withdrawing pressurized air includes withdrawing air from a compressor of said gas generator of one of said running turboshaft engines.

12. Method according to claim 10, further comprising a step of adjusting mechanical power provided by said air turbine to said turboshaft engine in standby mode.

13. Method according to claim 12, wherein said step of adjusting power comprises a step of controlling flow and/or pressure of air delivered to said air turbine.

* * * * *